April 1, 1958      F. J. HART      2,828,853
COMBINATION ELEVATOR AND GRAIN AND CORN HOPPER
Filed Sept. 2, 1955      2 Sheets-Sheet 1
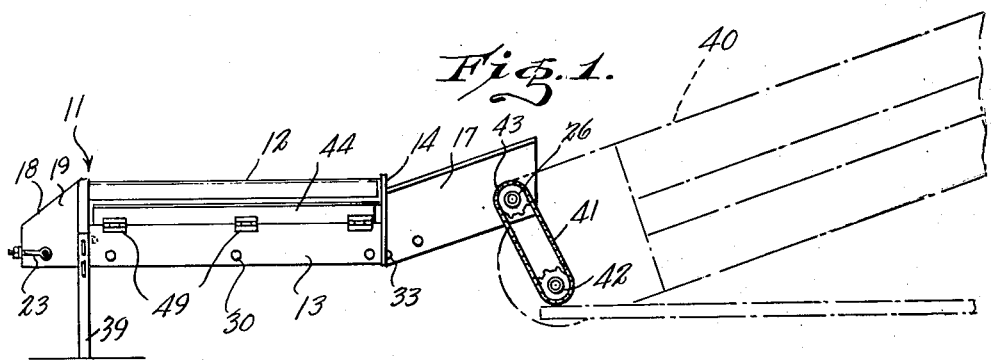
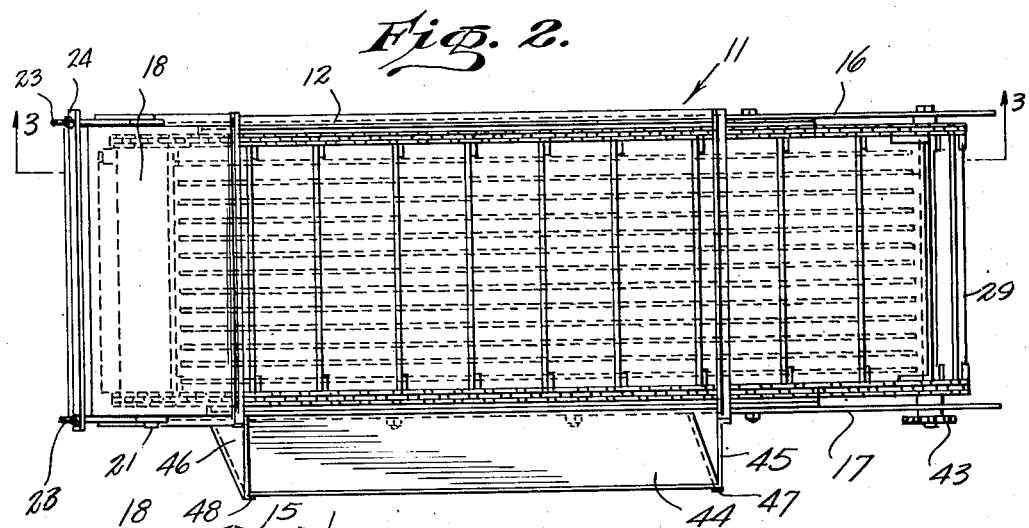
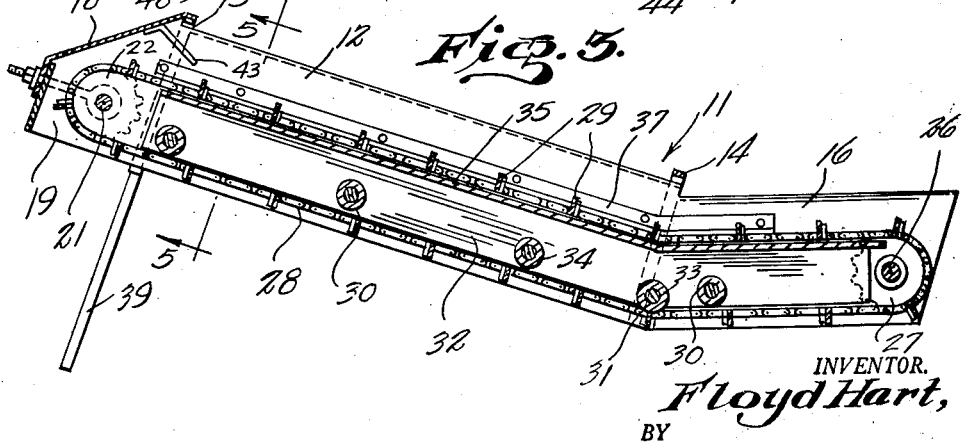
INVENTOR.
Floyd Hart,
BY
McMorrow, Berman + Davidson
ATTORNEYS.

April 1, 1958 F. J. HART 2,828,853
COMBINATION ELEVATOR AND GRAIN AND CORN HOPPER
Filed Sept. 2, 1955 2 Sheets-Sheet 2
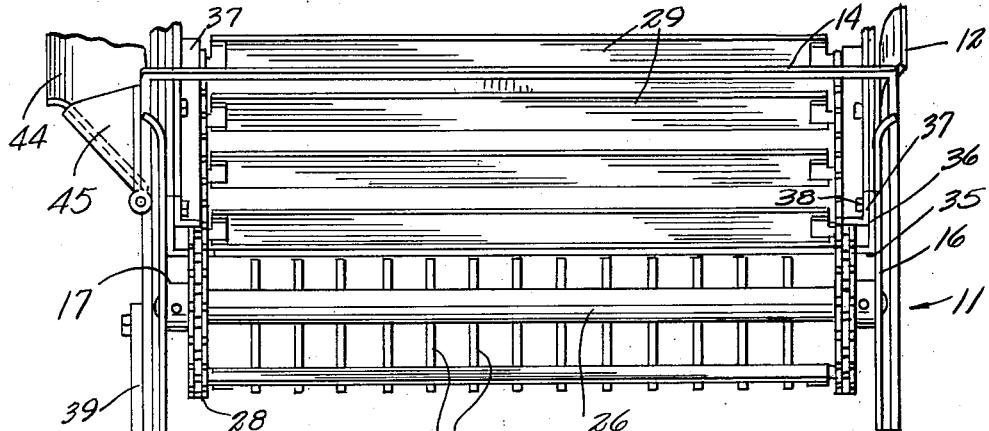
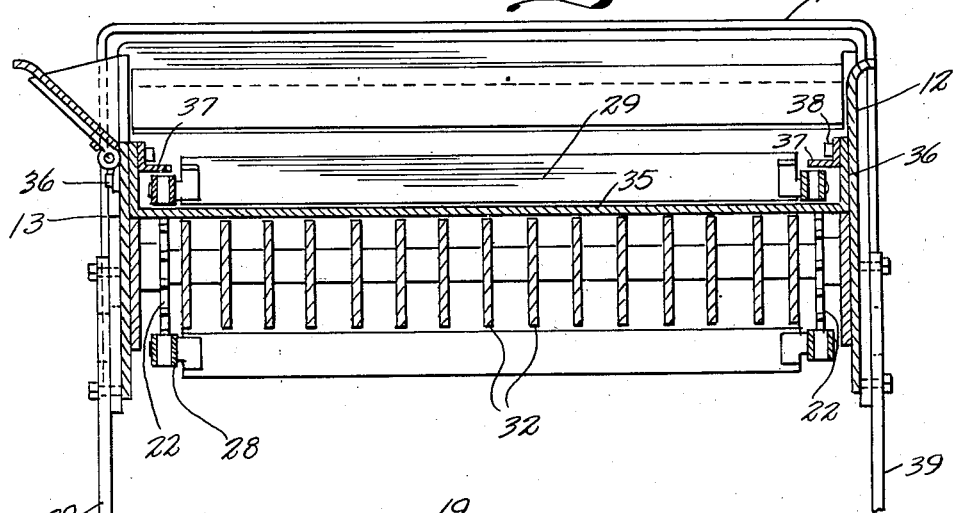
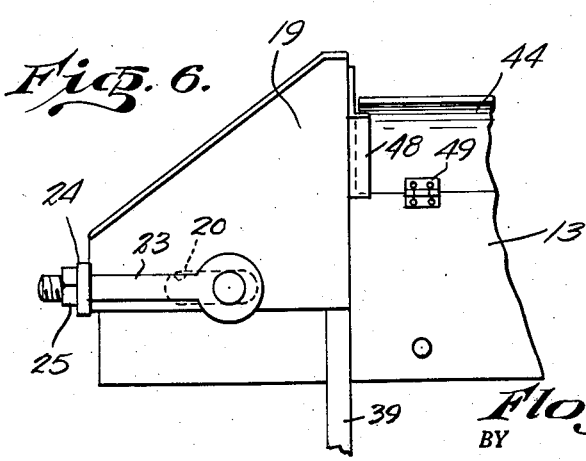
INVENTOR.
Floyd Hart,
BY
McMorrow, Berman & Davidson
ATTORNEYS.

United States Patent Office

2,828,853
Patented Apr. 1, 1958

2,828,853

COMBINATION ELEVATOR AND GRAIN AND CORN HOPPER

Floyd J. Hart, Cottonwood, Minn.

Application September 2, 1955, Serial No. 532,288

2 Claims. (Cl. 198—172)

This invention relates to agricultural devices, and more particularly to a combination elevator and hopper device for use with a grain elevator or the like to receive agricultural produce such as grain, corn, or the like and to convey the produce to the receiving end of the conventional elevator.

The main object of the invention is to provide a novel and improved portable conveying device which may be used either for elevating corn or for elevating grain, as required, the improved device being simple in construction, being easy to manipulate, and being relatively compact in size.

A further object of the invention is to provide an improved combination hopper and corn and grain elevating device adapted to be employed for conveying produce, such as corn, grain or the like to the receiving end of a conventional elevating machine for loading the produce into any desired receptacle, the improved elevating device of the present invention being arranged so that it may be readily set up for use either with corn or other produce having relatively large bulk, or with grain and similar produce of a more fluent character.

Further objects and advantages of the invention will become apaprent from the following description and claims, and from the accompanying drawings, wherein:

Figure 1 is a side elevational view of an improved portable elevating device according to the present invention, shown coupled to the receiving end of a conventional elevator and set up for operation.

Figure 2 is an enlarged top plan view of the improved elevating device illustrated in Figure 1.

Figure 3 is a longitudinal vertical cross sectional view taken on the line 3—3 of Figure 2.

Figure 4 is an enlarged end elevational view of the elevating device of Figures 1, 2 and 3.

Figure 5 is an enlarged tarnsverse vertical cross sectional view taken on the line 5—5 of Figure 3.

Figure 6 is an enlarged fragmentary side elevational detail view of the end portion of the elevating device of Figures 1 to 5, showing the belt-tension adjusting means employed for adjusting the tension of the conveyor belt of the device.

Referring to the drawings, the improved elevating device is designated generally at 11 and comprises a generally rectangular elongated frame having upstanding side walls 12 and 13 which are rigidly connected in parallel relationship by the transverse frame members 14 and 15, said frame members being of inverted U-shape and having depending vertical arms connected respectively to the side walls 12 and 13. As shown in Figures 1 and 3, the forward portion of the frame is angled upwardly relative to its main portion when said main portion is in the position shown in Figure 1, namely, in a substantially horizontal position. The forward ends of the side walls 12 and 13 are designated respectively at 16 and 17. The rear portions of the side walls 12 and 13 are connected by the transverse guard housing 18 having substantially triangular side walls 19, the rear marginal portions of the guard housing 18 being rigidly connected to the transverse frame member 15. Extending rotatably through respective longitudinal slots 20 in the side walls 19 is the transverse shaft 21 carrying the sprocket wheels 22, 22. The ends of the shaft 21 are externally engaged by respective eye bolts 23 adjacent the exterior surfaces of the side walls 19, said eye bolts extending through a transverse bar member 24 disposed adjacent the transverse wall of the shield housing 18 and secured against the transverse rear wall of said shield housing by nuts 25 threaded on the ends of the bolts 23. By means of nuts 25 the transverse shaft 21 may be adjusted longitudinally relative to the frame of the machine.

Journaled transversely in the forward end portions of the side wall sections 16 and 17 is another transverse shaft 26 carrying sprocket wheels 27, 27 longitudinally aligned with the respective sprocket wheels 22, 22. Engaged on the aligned sets of sprocket wheels 22, 27, are the respective sprocket chains 28, 28 which are connected by the spaced transverse conveyor bars 29.

Designated at 30 are respective transverse shafts connecting the lower portions of the side walls 12 and 13 and the lower portions of the side wall sections 16 and 17. A further transverse shaft 31 connects the lower portions of the side walls at the junctions between the angled forward sections 16 and 17 and the main body portions of the side walls. Rigidly secured on the shafts 30 are the parallel spaced, longitudinally extending vertical plate members 32 which extend for the major portion of the length of the side wall sections 12, 13 and 16, 17, as shown in Figure 3, said vertical plate members 32 being spaced apart by relatively short distances, sufficient to define a supporting surface for bulky produce such as corn or the like. As shown in Figure 3, the vertical plate members 32 follow the angled contour of the frame, said plate members being located in the lower portion of the frame and extending substantially the major portion of the distance between the sprocket shafts 21 and 26. The upper portion of the conveyor belt defined by the sprocket chains 28 and transverse conveyor bars 29 is located adjacent the top edges of the plate members 32. Designated at 33 are guide rollers rotatably mounted on the shaft 31, and similar rollers 34 may be provided on the shaft 30, said rollers being located adjacent the lower portions of the chains 28 and serving as guide means for said chains.

Designated at 35 is a plate member which may be disposed on the top edges of the longitudinally extending spaced vertical plate members 32 beneath the top portion of the conveyor belt defined by chains 28 and cross bars 29, as shown in Figure 3, the plate member 35 being formed with upstanding side flanges 36, 36 engageable against the inside surfaces of the side walls 12 and 13 and the side wall forward sections 16 and 17. Designated at 37, 37 are respective angle bars disposed over the top portions of the chains 28 and secured to the side walls 12 and 13 by a plurality of bolts 38 extending through the vertical flanges of the angle bars 37, the vertical flanges 36 of the plate member 35 and through the respective side walls 12 and 13. The plate 35 is thus detachably secured on the vertical plate 32 and below the top cross bars 29 of the conveyor belt, whereby relatively fluent material such as grain or the like may be moved along the plate member 35 by the conveyor cross bars 29. When relatively bulky material is to be moved, the plate member 35 may be detached, and the bulky material, such as corn or the like, is conveyed along the top edges of the vertical plate 32, allowing loose material, such as dirt, debris and the like to fall downwardly between the plates 32, and preventing such undesirable material from being conveyed with the produce.

Adjustably secured to the depending side arms of the transverse frame member 15 are the respective depending supporting legs 39 which may be employed to support the intake end of the elevating device. The discharge end of the device may be secured in any suitable manner to the intake end of a conventional elevator, shown partially in dotted view in Fig. 1 at 40, and the sprocket shaft 26 may be coupled by a suitable sprocket chain 41 to a drive sprocket 42 on the elevator 40, the shaft 26 being provided with a driven sprocket 43 on which the chain 41 may be engaged. The tension of the chains 28, 28 may be adjusted by adjusting the position of the nuts 25 on the bolts 23, as above described.

The transverse shield member 18 is provided on its upper inner portion with the inwardly extending and downwardly inclined shield plate 43 which overlies the sprocket shaft 21 and which serves to guide material onto the intake end of the conveyor belt defined by the chains 28 and the cross bars 29. The side wall 13 is further provided with a longitudinally extending inclined hopper plate 44 which is supported on respective flanged brackets 45 and 46 secured to the depending legs of the respective transverse frame members 14 and 15, said flanged brackets having the opposing bottom marginal flanges 47 and 48 on which the inclined plate 44 is supported, said inclined plate leading into the top portion of the elevating device and defining means for loading produce and similar material into the elevating device from the side thereof.

The plate member 44 may be suitably hinged to the top margin of the side wall 13, as by the provision of hinges 49 connecting the bottom margin of the plate 44 to the top marginal portion of the wall 13, as shown in Figure 6.

In operation, the elevating device is set up in the manner illustrated in Figure 1 with the inclined wall sections 16 and 17 connected to and supported by the intake end of the elevating machine 40, the shaft 26 being drivingly coupled to the sprocket wheel 42 of the elevating machine, as above explained. Thus, the conveyor belt defined by the chains 28 and the transverse bars 29 is driven directly by the main elevating machine. The elevating device 11 is arranged to be supported with its main portion extending substantially horizontally, as illustrated in Figure 1, the legs 39 being adjusted to provide proper elevation of the main, or hopper, portion of the elevating device. The material may then be loaded onto the elevating device, said material being carried by the conveyor belt to the intake end of the main elevator 40 in the manner above described.

As previously explained, when bulky produce, such as corn or the like is to be loaded, the plate 35 is removed, and the produce is moved along the top edges of the plates 32 by the conveyor cross bars 29. When relatively fluent material, such as grain or the like is to be loaded, the plate 35 is installed, and the material is moved along said plate to the intake end of the main conveyor 40.

When the device is set up for the loading of bulky produce, such as corn or the like, with the plate 35 removed, the undesirable debris, dirt, and the like is shaken from the produce and drops between the plates 32, whereby the produce reaches the main conveyor 40 in a relatively clean condition.

While a specific embodiment of an improved elevating device for agricultural produce has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A combination grain and corn elevating device comprising an elongated frame having upstanding side walls, transversely extending means connecting said side walls, and respective depending supporting legs secured to the ends of said side walls, a plurality of spaced parallel elongated longitudinally extending vertical plate members secured in said frame, a longitudinal belt conveyor mounted in said frame around said plate members, said belt conveyor comprising a pair of sprocket chains, a plurality of transversely extending conveyor bars connecting said chains, and respective sprocket wheels journaled at the ends of the frame supporting said chains, a horizontal plate member supported on the top edges of said vertical plate members, upstanding flanges on the longitudinal edges of said last-named plate member engaging the inside surfaces of said side walls, means on said flanges overlying said chains, and means detachably connecting said flanges to said side walls, whereby said last-named plate member is removably secured in said frame, said last-named plate member overlying said vertical plate members and underlying the transversely extending bars on the upper portion of said belt conveyor.

2. A combination grain and corn elevating device comprising an elongated frame having upstanding side walls, transversely extending means connecting said side walls, and respective depending supporting legs secured to the ends of said side walls, a plurality of spaced parallel elongated longitudinally extending vertical plate members secured in said frame, a longitudinal belt conveyor mounted in said frame around said plate members, said belt conveyor comprising a pair of sprocket chains, a plurality of transversely extending conveyor bars connecting said chains, and respective sprocket wheels journaled at the ends of the frame supporting said chains, a horizontal plate member supported on the top edges of said vertical plate members, upstanding flanges on the longitudinal edges of said last-named plate member engaging the inside surfaces of said side walls, respective angle bars adjacent said flanges overlying said chains, and means detachably connecting said flanges and angle bars to said side walls, whereby said last-named plate member is removably secured in said frame, said last-named plate member overlying said vertical plate members and underlying the transversely extending bars on the upper portion of said belt conveyor.

References Cited in the file of this patent

UNITED STATES PATENTS

| | | |
|---|---|---|
| 121,192 | Page | Nov. 21, 1871 |
| 1,006,790 | Reinbold | Oct. 24, 1911 |
| 1,820,944 | Marx | Sept. 1, 1931 |
| 1,092,093 | Cizek | Mar. 31, 1941 |
| 2,267,419 | Oster | Dec. 23, 1941 |